March 12, 1968 — S. RUBENSTEIN — 3,373,043
METHOD OF PACKAGING COFFEE AND PACKAGE
Filed July 29, 1966

Inventor:
Sherman Rubenstein
BY Robert L. Kahn ATTY.

United States Patent Office 3,373,043
Patented Mar. 12, 1968

3,373,043
METHOD OF PACKAGING COFFEE AND PACKAGE
Sherman Rubenstein, Skokie, Ill., assignor to Robert L. Kahn and Harry Rubenstein, both of Chicago, Ill., as joint trustees.
Filed July 29, 1966, Ser. No. 568,972
3 Claims. (Cl. 99—77.1)

ABSTRACT OF THE DISCLOSURE

A desired quantity of coffee is disposed in normally porous paper sized with a harmless water soluble material as vinyl acetate acrylate copolymer. The package is heat sealed and, prior to brewing, protects coffee from atmosphere. During brewing, the water soluble sizing is dissolved and permits normal brewing to occur. After brewing, the entire package may be thrown out.

---

This invention makes it possible to pre-package coffee and package containing such coffee. In connection with preparing coffee in a percolator primarily for home use, it is customary to use the coffee in loose form. An objection to preparing coffee for home use is in connection with the disposition of spent coffee grounds. As a rule, disposing of coffee grounds from a coffee pot or percolator to a garbage pail is rather messy and has been responsible for many people turning to so-called "instant" coffee in powdered form.

This invention makes it possible to pre-package coffee with the assurance that the spent grounds can be disposed of easily and conveniently. The problem in merchandising coffee is basically different from that encountered with tea. It is well known that coffee, after roasting and grinding, is sealed to inhibit the escape of aromatic constituents of the coffee. In conventional coffee cans where say a pound of coffee is packaged, provision is made for maintaining the coffee particles sealed from air until the can is opened for use. Thereafter, reliance is had upon the rapid use of the coffee to prevent fresh coffee particles from becoming too stale for use. Even then, it is well known that as soon as a coffee can is opened, deterioration begins.

This invention contemplates the packaging of fresh coffee in conventional form for use in a percolator (such form having the coffee particles ground in various degrees of fineness but not in powdered form) in bags of sheet material having the following characteristics—the material can be heat-sealed, preferably by the use of high frequency di-electric type of equipment; must be non-porous to air prior to wetting; must become porous when the sheet material has been wet; must withstand boiling water without opening at seams; and must be acceptable for use in foods—non-toxic, free from taste, odor or undesired water-soluble components. A sheet material which answers these requirements consists of a suitable wet strength normally porous paper or fabric impregnated with or sized with vinyl acetate acrylate copolymer. Such a coated sheet material has all the highly desirable properties set forth above. Upon wetting with water, whether cold or hot, the copolymer identified above appears to open up the pores of the paper or fabric and permits water to pass through the sheet material quite freely. Thus coffee in a wet package of the above identified sheet material acts as if the coffee particles were unpackaged insofar as ready access of water is concerned. The above identified copolymer is additionally advantageous in that such material has been approved by the United States Department of Agriculture for use in connection with foods.

Figure 1:
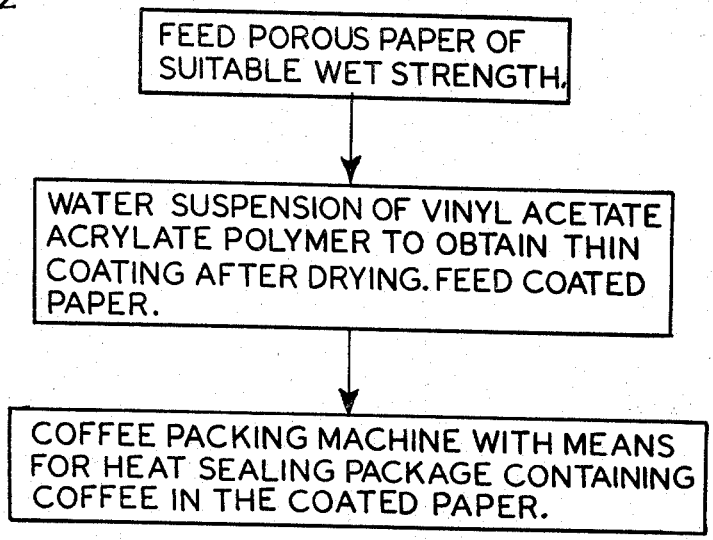
Figure 2:
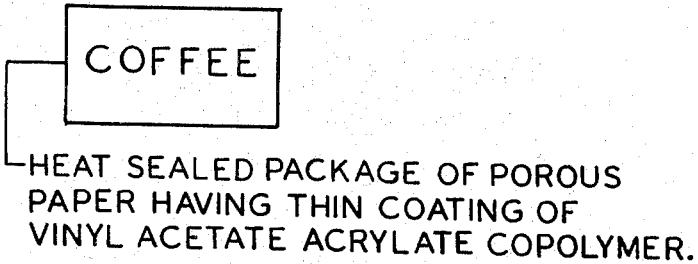

The invention will now be described in connection with the drawings wherein FIG. 1 is a flow sheet illustrating the steps in the new method of packaging coffee and FIG. 2 illustrates an exemplary package.

Referring to FIG. 1, for example, a sheet of long fibre paper such as, for example, the so-called manila, long fibre type having a porosity in a Gurley test in excess of about 200 cubic feet of air per square foot of paper per minute under a pressure created by having a vacuum of about ½ inch water of water pressure. The paper preferably has a tensile strength when wet which is sufficient to maintain the package intact in water as well as to permit processing and may, as an example, have a wet strength of about from 1,000 to about 2,000 grams per inch of width of the paper and when dry will have a strength of about three or four times the above value. The thickness of the paper used is not critical and, as an example, .00135 inch (this is a conventional thickness available on the market) can be used. Such paper is frequently used in tea bags. The density of the above identified paper is such that 500 sheets of 24 inches by 36 inches will run about 12 pounds. Such paper is available in roll form in various widths for use on packaging machinery. Instead of paper, a loosely woven fabric may also be used although paper is preferred.

The sheet material specified above is run through a water suspension of vinyl acetate acrylate copolymer. A water suspension of about 27 percent of the copolymer may be used as an example and dried so that the coating thickness is preferably from about one-tenth of a mil (.0001 inch) to about three-tenths of a mil. The thickness of coating is not critical. After such a coating has been applied and paper has been thoroughly dried to leave a non-porous sheet of paper coated with said copolymer, it can be fed to a conventional packaging machine. There a tube of the coated paper is prepared and filled with a desired amount of fresh coffee. The coffee package will then have its seams heat-sealed at a suitable station so that fresh coffee is contained within a sealed envelope of non-porous coated paper. It is understood that sealed packages of various sizes corresponding to one, two or any desired number of cups of coffee, can be prepared.

The coffee packages of any shape, each one having a sealed enclosure for the coffee contents, can then be packed in any type of container which need not be airtight.

To use one or more packages, it is only necessary to put the desired number or size of package in a coffee percolator and proceed in conventional fashion. The technique for brewing is exactly the same with a packaged coffee as with conventional loose coffee. At the conclusion of the brewing operation the wet package or packages of coffee can be removed from the percolator and discarded in a garbage pail.

In connection with the manufacture of the package, care must be exercised to have all seams of the package heat-sealed to prevent escape of the contents, whether dry or wet. Porous paper as specified above and having the coating applied thereto as specified above can be heat-sealed in conventional fashion to provide seals which are strong and will remain intact in boiling water. The brewed coffee cannot be distinguished from coffee prepared by using loose coffee in the same percolator. The paper and coating have no effect on the coffee and have no tendency to impair the purity or taste of the product.

A long-fibred paper is preferred for the reason that such paper usually has a greater wet strength. Any porous paper having a desirable wet strength can be used. The requirements for wet strength are dictated in part by the tensioning procedure used in connection with the cutting operation. Paper pulled through a copolymer suspension will naturally become wet and must be able to withstand the pull on the paper incident to the handling of such paper in a coating machine. Insofar as the porosity is concerned, the greater the porosity of the coated paper in water, the more nearly brewing time of the packaged coffee will correspond roughly to brewing time of conventional loose coffee. It is understood that the porosity of the paper can vary over substantial limits depending upon the requirements of the coffee processor.

What is claimed is:

1. A method of packaging coffee which comprises disposing a measured amount of fresh coffee in a long-fibre, normally porous paper having as a sizing a thin coating of vinyl acetate acrylate copolymer, which coating fills the pores of said paper and renders the same non-porous, preparing said paper with deposited coffee into a coffee bearing package and heat-sealing the seams of said coated paper, said coffee during shelf life being sealed from atmosphere, said package having the characteristic of remaining intact during coffee brewing and said coating, when wet, permitting water to flow through said material for coffee brewing, said package being readily disposable after brewing.

2. The method according to claim 1 wherein said paper is of the so-called manila long-fibre type having a minimum porosity in a Gurley test of about 200 cubic feet of air per square foot of paper per minute, said paper having sufficient tensile strength when wet to withstand the coating operation and withstand handling in connection with removal of said package after a brewing operation has been completed.

3. A package comprising a quantity of coffee, normally ready for brewing, sealed in a coated paper, said uncoated paper being normally porous and having long fibers, said paper having as a sizing coating a thin coating of vinyl acetate acrylate copolymer, said coating having the characteristics of heat-sealability and, when wet, permitting said paper to pass water therethrough.

References Cited
UNITED STATES PATENTS 1,324,662  12/1919  Goldsworthy _____ 99—77.1 X
3,121,657  2/1964  Magill _____ 161—159

ALVIN, E. TANENHOLTZ, *Primary Examiner.*

S. DAVIS, *Assistant Examiner.*